(12) United States Patent
Horvath

(10) Patent No.: US 11,151,260 B2
(45) Date of Patent: Oct. 19, 2021

(54) PROVIDING AND CHECKING THE VALIDITY OF A VIRTUAL DOCUMENT

(71) Applicant: Bundesdruckerei GMBH, Berlin (DE)

(72) Inventor: Olaf Horvath, Berlin (DE)

(73) Assignee: BUNDESDRUCKEREI GMBH, Berlin (DE)

(*) Notice: Subject to any disclaimer, the term of this patent is extended or adjusted under 35 U.S.C. 154(b) by 242 days.

(21) Appl. No.: 16/334,189

(22) PCT Filed: Oct. 11, 2017

(86) PCT No.: PCT/EP2017/075940
§ 371 (c)(1),
(2) Date: Mar. 18, 2019

(87) PCT Pub. No.: WO2018/073071
PCT Pub. Date: Apr. 26, 2018

(65) Prior Publication Data
US 2019/0205547 A1    Jul. 4, 2019

(30) Foreign Application Priority Data
Oct. 21, 2016    (DE) ..................... 10 2016 220 656.7

(51) Int. Cl.
*G06F 21/60* (2013.01)
*G06F 21/62* (2013.01)
(Continued)

(52) U.S. Cl.
CPC ............ *G06F 21/602* (2013.01); *G06F 21/36* (2013.01); *G06F 21/6227* (2013.01);
(Continued)

(58) Field of Classification Search
CPC .... G06F 21/602; G06F 21/36; G06F 21/6227; G06F 21/64; G06F 21/645; G06K 7/1417;
(Continued)

(56) References Cited

U.S. PATENT DOCUMENTS

| | | | |
|---|---|---|---|
| 10,826,900 B1* | 11/2020 | Poder | H04L 63/105 |
| 2011/0026853 A1* | 2/2011 | Gokturk | G06F 16/5838 |
| | | | 382/305 |

(Continued)

FOREIGN PATENT DOCUMENTS

WO    WO-2016/015041 A1    1/2016

OTHER PUBLICATIONS

Anonymous: "blocks—Storing document/file in blockchain—Ethereum Stack Exchange", Aug. 8, 2016 (Aug. 8, 2016), XP055432335, Retrieved from the Internet <URL:https://ethereum.stackexchange.com/questions/7842/storing-document-file-in-blockchain> [retrieved on Dec. 6, 2017].

(Continued)

*Primary Examiner* — Ayoub Alata
(74) *Attorney, Agent, or Firm* — Harness, Dickey & Pierce, P.L.C.

(57) ABSTRACT

A method for providing and checking the validity of a virtual document on a first computer system is disclosed. The virtual document is provided by means of a mobile second computer system for a first computer system. The method includes receiving a password-protected storage address of a first database at which the virtual document can be read, reading the virtual document, displaying the virtual document on a display of the first computer system, receiving a unique second identifier of the mobile second computer system, calculating a third identifier using the received second identifier and a hash value of the virtual document, identifying the database entry of the second database in which a first identifier of a first pairing consisting of the mobile second computer system and the first virtual document is stored, comparing the calculated third identifier with the first identifier stored in the identifier database entry.

23 Claims, 3 Drawing Sheets

(51) Int. Cl.
| | |
|---|---|
| G06F 21/64 | (2013.01) |
| G06Q 50/18 | (2012.01) |
| G07F 7/10 | (2006.01) |
| G07F 7/12 | (2006.01) |
| H04L 9/32 | (2006.01) |
| G06Q 20/32 | (2012.01) |
| G06Q 20/40 | (2012.01) |
| G06Q 20/36 | (2012.01) |
| G06Q 20/34 | (2012.01) |
| G06F 21/36 | (2013.01) |
| G06K 7/14 | (2006.01) |
| H04L 9/06 | (2006.01) |
| H04L 29/06 | (2006.01) |

(52) U.S. Cl.
CPC ............ *G06F 21/64* (2013.01); *G06F 21/645* (2013.01); *G06K 7/1417* (2013.01); *G06Q 20/322* (2013.01); *G06Q 20/351* (2013.01); *G06Q 20/3674* (2013.01); *G06Q 20/409* (2013.01); *G06Q 50/18* (2013.01); *G07F 7/1008* (2013.01); *G07F 7/122* (2013.01); *H04L 9/0637* (2013.01); *H04L 9/3215* (2013.01); *H04L 9/3239* (2013.01); *H04L 63/0442* (2013.01); *G06Q 2220/10* (2013.01)

(58) Field of Classification Search
CPC ............... G06Q 20/322; G06Q 20/351; G06Q 20/3674; G06Q 20/409; G06Q 50/18; G06Q 2220/10; G07F 7/1008; G07F 7/122; H04L 9/0637; H04L 9/3215; H04L 9/3239; H04L 63/0442

See application file for complete search history.

(56) References Cited

U.S. PATENT DOCUMENTS

| | | | |
|---|---|---|---|
| 2014/0270400 | A1 | 9/2014 | Natale et al. |
| 2014/0270401 | A1* | 9/2014 | Irwin ................. G06K 9/00483 382/115 |
| 2014/0279519 | A1 | 9/2014 | Mattes et al. |
| 2014/0289832 | A1* | 9/2014 | Rosenberg .......... H04L 49/9063 726/7 |
| 2016/0028552 | A1* | 1/2016 | Spanos ................ H04L 9/3236 713/178 |
| 2018/0150647 | A1* | 5/2018 | Naqvi .................. G06F 21/602 |

OTHER PUBLICATIONS

International Search Report PCT/ISA/210 for International Application No. PCT/EP2017/075940 dated Jan. 3, 2018.
Written Opinion of the International Searching Authority PCT/ISA/237 for International Application No. PCT/EP2017/075940 dated Jan. 3, 2018.

* cited by examiner

PROVIDING AND CHECKING THE VALIDITY OF A VIRTUAL DOCUMENT

CROSS-REFERENCE TO RELATED APPLICATIONS

This application is a national phase under 35 U.S.C. § 371 of PCT International Application No. PCT/EP2017/075940 which has an International filing date of Oct. 11, 2017, which claims priority to German Application No. 102016220656.7, filed Oct. 21, 2016, the entire contents of each of which are hereby incorporated by reference.

The invention relates to a method for providing and checking the validity of a virtual document, and to a system for carrying out the method. In particular, the invention relates to a method for checking the validity of a virtual document provided by means of a mobile computer system, for example a smartphone.

In order to prove the authenticity of a document and to secure the document against attempts at forgery, the use of a number of different security features is known. These security features are characteristic properties of the document body and are intended to make forgery impossible or at least to hinder it significantly.

These features can be examined, inter alia, using chemical and physical methods, for example by means of a UV test device.

The greater the significance or value of an object, the more security features it has. This is true in particular for sovereign documents, such as identity cards or passports.

The authenticity assurance of documents by means of the document body and security features comprised thereby, however, means that the corresponding document always has to be carried on one's person as a physical object. In some circumstances it is therefore necessary to carry a number of different physical documents. Such a number of physical documents however on the one hand is cumbersome and on the other hand results in a high likelihood of at least some documents being left behind at home, and therefore not to hand when needed.

The fixed affiliation of the authenticity of precisely one document to precisely one physical document body can be eliminated for example by use of virtual documents. For example, this makes it possible for a person to carry a number of documents with them on a smartphone. In the case of documents that have high security requirements however, such as sovereign documents, the loss of the security features affiliated with the document body must be compensated. This is achieved for example by additional hardware components or software components which have to be implemented in order to ensure sufficient security of the virtual documents. These additional components however make corresponding computer systems, which are suitable for the secure use of virtual documents, technically complex and therefore costly.

The object of the invention is to create a simple, efficient and secure method for checking the validity of a virtual document. The problem forming the basis of the invention is solved by the features of each of the independent claims. Embodiments of the invention are specified in the dependent claims.

Embodiments comprise a method for providing and checking the validity of a first virtual document on a first computer system, and a corresponding computer system for carrying out the method. The first virtual document is provided by means of a mobile second computer system for the first computer system. The first virtual document is stored in a first database of a third computer system, wherein a plurality of virtual documents is stored in the first database. The first computer system comprises a first communication interface for contactless communication with the mobile second computer system and for communication with the third computer system via a network. The first computer system also comprises a first display for displaying the first virtual document. The first computer system has access to a cryptographically secured second database, which comprises identifiers for pairings consisting of computer systems and the virtual documents of the first database. The identifiers of the second database comprise a first identifier of a first pairing consisting of the mobile second computer system and the first virtual document.

The method for providing and checking the validity of the first virtual document comprises the following steps:

receiving a password-protected storage address of the first database at which the first virtual document can be read, reading the first virtual document, displaying the first virtual document on the first display of the first computer system, receiving a unique second identifier of the mobile second computer system, calculating a third identifier using the received second identifier and a hash value of the first virtual document, identifying the database entry of the second database in which the first identifier is stored, comparing the calculated third identifier with the first identifier stored in the identified database entry, if the calculated third identifier matches the stored first identifier, confirming the validity of the virtual document.

Embodiments may have the advantage that the password-protected storage address of the first database at which the first virtual document can be read does not comprise any personal data. Consequently, the storage address may be publicly known, without revealing sensitive personal data of the user of the mobile second computer system. Neither the safeguarding nor transmission of the storage address is subject to high security requirements. This in particular facilitates transmission of the storage address by near-field communication, for example by means of RFID, Bluetooth® or WLAN. For example, the communication can be performed wirelessly in accordance with ISO standard 14443 at a frequency of 13.56 MHz. Alternatively, communication can also be performed in accordance with Bluetooth® standard 4 or 5. For example the storage address, i.e. beacon, can be sent at fixed time intervals to the surrounding environment. For example, the storage address may be a URI (uniform resource identifier) or URL (uniform resource locator). The third computer system is for example a computer system embedded in a cloud environment.

The password protection ensures that, even if the storage address is generally accessible and in particular is wirelessly transmitted unencrypted, the access to the virtual document and thus to the data comprised by the document is limited to computer systems or individuals authorised for such access. Only somebody having a valid password can also actually read the virtual document.

The read virtual document is displayed on the display of the first computer system, and the data comprised by the virtual document can be seen by a user of the first computer system. For example, the virtual document comprises identification features of the document owner, for example a photograph and/or details regarding height, eye colour and age. On the basis of these features the user of the first computer system can check whether the user of the mobile second computer system is actually also the owner of the virtual document. In the case of an identity document the user of the mobile second computer system can thus be identified.

For example, the virtual document may be a driver's licence, and the first computer system may be a portable mobile radio device belonging to a policeman carrying out a vehicle spot-check, or a stationary personal computer at a car rental location where the owner of the driver's licence is seeking to hire a vehicle. For example, the virtual document could also be an identity card, and the first computer system could be a portable mobile radio device or a stationary personal computer belonging to a policeman performing a personal identity check, or a stationary personal computer at the reception desk of a hotel where the owner of the identity document is seeking to book a room.

An authentication with an identity document in the form of a physical document with fixedly assigned document body comprising a plurality of security features and a photograph of the document owner is basically two-factor authentication. A two-factor authentication of this kind is used to authenticate a user by means of the combination of two factors. These factors can be provided for example in the form of an object in the possession of the user and a feature linked inseparably to the user. In the case of the aforementioned identity document, the authentication is performed by confirming the ownership of the corresponding identity document and by the face of the user, which, for successful authentication, must match the photograph of the owner of the identity document.

Embodiments may have the advantage that they also enable two-factor authentication. Besides a match between the appearance of the user of the mobile second computer system, for example a smartphone, and a photograph of the document owner comprised by the virtual document, the mobile second computer system must be a computer system associated with the virtual document. This association is established and proven by the entry in the cryptographically secured second database.

The mobile second computer system may be a laptop or palmtop computer, a personal digital assistant, a mobile telecommunications device, in particular a smartphone or the like, for example. In accordance with further embodiments the mobile second computer system may also be a computer system of a personal transportation means of a user, such as the on-board computer of a car.

The mobile second computer system for example may also be what is known as a 'wearable' or 'wearable computer', i.e. a computer system that is arranged on the body of the user during use. Examples of wearables are smartwatches, that is to say watches with computer functionality and connectivity, activity trackers, i.e. devices for recording and sending fitness- and/or health-related data, smartglasses, i.e. glasses with an inner side used as a screen, or items of clothing in which electronic aids for communication are incorporated.

The first computer system, if this is likewise configured as a mobile computer system, may likewise be a computer system of the above-listed kind, provided these comprise a display. The first computer system may additionally also be a stationary computer system, for example a personal computer.

As a result of the pairing by means of entry into the cryptographically secured second database, a plurality of virtual documents can be paired with the same mobile second computer system. Thus, it is not necessary to have a separate physical document body for each document. For example, both a virtual identity card and a virtual driver's licence are paired with the same smartphone. A user must therefore merely carry his smartphone with him in order to have available his identity card and his driver's licence.

Furthermore, a virtual document may also be paired with a number of devices. For example, a user may pair his driver's licence both with his smartphone and with the on-board computer of one or more cars used by him. The user thus always has his driver's license available when he is travelling in one of the corresponding cars. As a result of the smartphone, he additionally has his driver's licence available when he is travelling in a different car or by another vehicle, such as a motorbike.

By using a unique identifier of the second computer system and the hash value of the virtual document, the pairing between the second computer system and the virtual document can be determined uniquely. The unique identifier of the mobile second computer system is for example an IMEI (international mobile station equipment Identity), an ICCID (integrated circuit card identifier), an MEID (mobile equipment identifier), an android device ID, a serial number, WLAN MAC address or a Bluetooth® address.

A computer or computer system may comprise an interface for connection to a network, wherein the network may be a private or public network, in particular the Internet. Depending on the embodiment, this connection can also be established via a mobile network.

Here, a "database" is understood generally to mean a compilation of data in the form of database entries in accordance with a fixed organisational structure of the database. A database may additionally comprise a management program for managing the database. A cryptographically secured database is understood to mean a database of which the entries are cryptographically secured. For example, the database comprises encrypted and/or signed data. A cryptographically secured database is understood here in particular to mean a blockchain.

A "certificate" is understood here to mean a digital certificate, also referred to as a public key certificate. Hereinafter, "digital" objects are also referred to as "virtual" objects, i.e. data constructs for electronic data processing. By means of certificates of this kind based on asymmetric key pairs, what is known as a public key infrastructure (PKI) is provided. A certificate of this kind is formed by structured data used to assign a public key of an asymmetric cryptosystem to an identity, such as a person or a device. A certificate for example may contain a public key and may be signed. Alternatively, certificates based on zero-knowledge cryptosystems are also possible. For example, the certificate may correspond to the X.509 standard or another standard. For example, the certificate is a CV certificate or card verifiable certificate (CVC). Implementation of CVCs of this kind is specified for example in ISO/IEC 7816-8.

The PKI constitutes a system for issuing, distributing and checking digital certificates. A digital certificate is used in an asymmetric cryptosystem to confirm the authenticity of a public key and a permitted range of use and validity. The digital certificate is itself protected by a digital signature, the authenticity of which can be checked with the public key of the issuer of the certificate. In order to check the authenticity of the issuer key, a digital certificate is again used. In this way, a chain of digital certificates can be built up, with each of the certificates confirming the authenticity of the public key with which the previous certificate can be checked. A chain of certificates of this kind forms what is known as a validation path or certification path. The subscribers of the PKI must be able to rely on the authenticity of the last certificate, or what is known as the root certificate, and the key certified by this certificate, without a further certificate. The root certificate is managed by what is known as a root certification authority, wherein the authenticity of all certificates of the PKI stems from the authenticity of said root certificate, which is presupposed to be secured.

Digital certificates are a tried and tested means for proving authorisations in the safeguarding of electronic communication by asymmetric cryptographic methods. Certificates are structured data that document the authenticity and/or further properties/authorisations of the owner of a public key (signature check key) and generally confirm the certification authority assigning the certificate by way of an independent, trustworthy authority (certification service provider (CSP)). Certificates are generally made available to a wide circle of people so as to allow said circle of people to check the authenticity and validity of electronic signatures.

A certificate may be associated with an electronic signature if the private key belonging to the public key was used to generate the electronic signature to be checked. Since a CSP provides, generally, a certificate in association with a public key, a CSP enables the users of asymmetric cryptosystems to associate the public key with an identity, for example a person, an organisation, or an energy or computer system.

Asymmetric key pairs are used for a large number of cryptosystems and also play an important role in the signing of electronic documents. An asymmetric key pair consists of a private key, which is used to encrypt data and generally must be kept secret, and a public key, which may be forwarded to third parties, for example to a service provider and/or a CSP. The public key allows anybody to encrypt data for the owner of the private key and to check or authenticate digital signatures of documents belonging to the owner. A private key allows its owner to decrypt data encrypted with the public key or to create digital signatures for electronic documents. Digital signatures are used for secure electronic data exchange, for example over the Internet, and make it possible to check identities and/or authorisations and the authenticity of the exchanged data. In order to ensure this, a public key infrastructure is generally necessary, which confirms the validity of the used keys by certificates.

The creation of a digital signature, also referred to hereinafter merely as a "signature", is a cryptographic method in which a further data value, which is referred to as a "signature", is calculated for any data, for example an electronic document. The signature may be for example an encrypted hash value of the electronic document, in particular a hash value encrypted with a private key of a cryptographic key pair associated with a certificate. A corresponding encryption of a hash value is consequently referred to as a signing of the hash value. The particular feature of a signature of this kind lies in the fact that its authorship and affiliation to a certain person or authority can be checked by any third party.

A digital signature is also understood here to mean a digital seal which is not associated with a natural person, but a legal entity. A digital seal therefore is not used to deliver a declaration of intent of an individual person, but instead of an institution as proof of origin. It can therefore guarantee the origin and integrity of virtual documents and can prove that they originate from a specific legal entity.

A "memory" will be understood here to mean both volatile and non-volatile electronic memories or digital storage media.

A "non-volatile memory" is understood here to mean an electronic memory for the permanent storage of data. A non-volatile memory can be configured as a non-changeable memory, also referred to as a read-only memory (ROM), or as a changeable memory, also referred to as a non-volatile memory (NVM). In particular, the memory in this case may be an EEPROM, for example a flash EEPROM, referred to as a flash for short. A non-volatile memory is characterised in that the data stored thereon are retained even once the power supply has been switched off.

A "volatile electronic memory" is understood here to be a memory for temporarily storing data, which memory is characterised in that all data are lost once the power supply is switched off. In particular, the memory in this case may be a volatile direct access memory, also referred to as a random-access memory (RAM), or a volatile main memory of the processor.

A "protected memory area" is understood here to mean an area of an electronic memory to which access, that is to say read access or write access, is possible only via a processor of the corresponding electronic device. In accordance with embodiments the access by the processor coupled to the memory is possible only when a condition necessary for this is satisfied. For example, this may be a cryptographic condition, in particular a successful authentication and/or a successful authorisation check.

A "processor" is understood here and hereinafter to mean a logic circuit used to execute program instructions. The logic circuit can be implemented on one or more discrete components, in particular on a chip. In particular, a "processor" is understood to mean a microprocessor or a microprocessor system formed of a plurality of processor cores and/or plurality of microprocessors.

An "interface" is understood here to mean an interface via which data can be received and sent, wherein the communication interface can be configured in a contact-based manner or contactlessly. The communication interface may be an internal interface or an external interface, which for example is connected to an associated device by means of a cable or wirelessly.

Communication can occur here for example via a network. A "network" is understood here to mean any transmission medium with connectivity for communication, in particular a local connection or a local network, in particular a local area network (LAN), a private network, in particular an Intranet, and a virtual private network (VPN). For example, a computer system may have a standard radio interface for connection to a WLAN. It may also be a public network, such as the Internet. Depending on the embodiment, the network may also be a mobile radio network.

Communication can occur via an optical channel between two optical interfaces. The two optical interfaces may be, for example, a display for displaying and/or sending optical data and a digital camera for recording and/or for receiving the optical data.

A "document" is understood in particular to mean an identification document, value or security document, in particular a sovereign document, in particular a paper-based and/or plastic-based document, such as an electronic identification document, in particular a passport, identity card, visa, driver's license, vehicle registration certificate, health card, or a corporate identity card, or another ID document, a chip card, payment means, in particular bank card or credit card, consignment note or another proof of authorisation. In particular, the document may be a machine-readable travel document, as standardised for example by the international civil aviation authority (ICAO) and/or the BSI.

A "virtual" document is understood to mean a data construct for electronic data processing which comprises the same data as a previously defined document, but no fixedly associated physical document body. In particular, the validity of a document of this kind is independent of the presence of a fixedly associated document body. A "virtual" document may be an electronic file of any file format, in particular a non-executable text file or table file.

A "program" or "program instructions" is/are understood here to mean, without limitation, any kind of computer program comprising machine-readable instructions for controlling a function of the computer.

The use of ordinal numbers, such as first, second, third, etc., is used here, unless otherwise evident from the specific context, merely to distinguish between elements that are different from one another, and is not intended to imply any specific order. In accordance with embodiments a master password for reading virtual documents from the first database is stored in a protected memory area of a memory of the first computer system. The first virtual document is read with use of the master password. Embodiments may have the advantage that for example first computer systems associated with the police force are configured to be able to read virtual identity documents, such as virtual identity cards, virtual passports or virtual residence permits, or virtual driver's licences at any time. To this end, the mobile second computer system sends the password-protected storage address at predefined time intervals, for example continually. A policeman with a corresponding first computer system, when performing a personal identity check or vehicle spot-check, is thus able to access, at an early stage, the virtual identity document of a person to be checked. This may have the advantage that the cheque can be performed from a sufficient safety distance, in particular outside the reach of the person being checked.

In accordance with embodiments the method further comprises the following step: receiving a password for reading the first virtual document, wherein the first virtual document is read using the received password. Embodiments may have the advantage that the user of the mobile second computer system, who is generally also the owner of the virtual document, can exert effective access control over the virtual document by controlling the distribution of the one or more passwords.

In accordance with embodiments the received password is a one-time password, with which the virtual document can be read once at the password-protected storage address. Embodiments may have the advantage that misuse of an access right granted once to the virtual document can be efficiently eliminated. In particular, unauthorised third parties are thus prevented from being able to read the virtual document, for example if the owner of the first computer system gives them the password or they gain access to the password in some other way. In addition, the security of the virtual document can thus be increased.

In accordance with embodiments the receiving of the password comprises the following: scanning the password, which is displayed on a second display of the mobile second computer system, using a scanner of the first computer system. Embodiments may have the advantage that the password is transmitted via an optical channel which is formed by the second display and the scanner. By means of an appropriate orientation of the display and scanner and optionally additional shielding measures, a transmission directed to a specific spatial angle can be implemented and can be better secured against spying attempts by third parties, for example as compared to an undirected transmission by means of RFID or Bluetooth®.

In accordance with alternative embodiments the displayed password may also be typed by a user of the first computer system or read aloud by the user of the mobile second computer system.

In accordance with embodiments the scanner is a digital camera. Embodiments may have the advantage that the interfaces used for the optical transmission channel, i.e. display and digital camera, are standard hardware, for example now available in all smartphones.

In accordance with embodiments the received password is displayed on the second display as a graphical code. In accordance with embodiments the graphical code is for example a QR code. Embodiments may have the advantage that they enable secure transmission of the password, i.e. in particular error-free and efficient transmission. The password is for this purpose encoded graphically prior to being sent from the mobile second computer system and is decoded again by the receiving first computer system after having been received.

In accordance with embodiments the received password is encrypted with a public cryptographic key of an asymmetric key pair associated with the first computer system. The method also comprises the following step: encrypting the received password using a private cryptographic key of the asymmetric key pair. Embodiments may have the advantage that they ensure secure transmission of the password from the mobile second computer system to the first computer system. Even if the transmitted password is intercepted or heard, an unauthorised third party not granted access to the private cryptographic key cannot use the password.

In accordance with embodiments the method also comprises the following step: receiving a storage ID of the second database, wherein the storage ID identifies the entry of the second database in which the first identifier is stored. The database entry of the second database in which the first identifier is stored is identified with use of the storage ID. Embodiments may have the advantage that they enable simple identification of the entry of the second database comprising the first identifier.

In accordance with embodiments the cryptographically secured second database is a blockchain and the first identifier is stored as a transaction in a block of the blockchain.

A "blockchain" is understood here and hereinafter to mean an ordered data structure, wherein each block of the blockchain is identified by a hash value and references a previous block in the blockchain; for examples of a blockchain see https://en.wikipedia.org/wiki/Block_chain_(database) and "Mastering Bitcoin", Chapter 7, The Blockchain, page 161 ff. The concept of blockchains was described in 2008 in a white paper under the pseudonym Satoshi Nakamoto in relation to Bitcoin ("Bitcoin: Peer-to-Peer Electronic Cash System" (https://bitcoin.org/bitcoin.pdf)). The blockchain consists of a series of data blocks, in each of which one or more transactions is/are contained which is/are provided with a checksum in the form of a hash value. New blocks of the blockchain are generated in a process that usually requires a great deal of processing power and is also referred to as mining. These newly generated blocks are then added to the blockchain and distributed over a network to all subscribers, or nodes of the network.

Embodiments may have the advantage that the blockchain, as a result of the storage of cryptographic checksums, i.e. hash values, of the previous block in the subsequent block, offers a high degree of security against subsequent manipulations. In a blockchain the transactions of a block are hashed together in pairs for example by a Merkle tree, and only the last hash value of the block obtained in this way, or what is known as the root hash value, is labelled as checksum in the header of the block. The blocks can be chained together with use of these root hash values. Each block of the blockchain contains, in its header, the hash of the entire previous block header. The order of the blocks is therefore fixed uniquely, and a chain structure is created. By means of the chaining of the individual blocks to one another implemented in this way, a subsequent modification of previous blocks or individual transactions comprised thereby and secured via the root hash value is practically impossible, since for this purpose the hash values of all subsequent blocks would likewise have to be recalculated in a short space of time.

In addition, the security can be additionally increased by means of an adaptation of the necessary processing power for the creation of new blocks. The processing power necessary for the creation of new blocks can be controlled via requirements on the hash value with the new block to be created. The resultant hash value is not predictable, and instead is a randomly distributed number. However, it is possible to calculate how much time is necessary to find a valid new block depending on the expended processing power on average. The hash value of a block may vary for example by adding and varying a nonce. On account of the chain structure, data that are stored once in a blockchain can no longer be changed or removed without replacing large parts of the blockchain. A replacement of this kind, however, is ruled out as a result of the amount of processing power required for the generation of new blocks. Known embodiments of the blockchain, such as Bitcoin in the case of cryptocurrency, are based on an anonymity of the partners involved in the transactions. By contrast, by means of the above-described signing of the hash values involved in the transactions, the authenticity thereof can be proven and their origin confirmed. Safeguarding against forgery can be improved hereby.

A requirement of a valid block may consist for example in the fact that the hash value of the header of the block is smaller than or equal to a limit value. The hash value can be calculated for example with the secure hash algorithm (SHA) SHA 256. The resulting hash value is in this case a random number between 0 and $2^{256}-1$. The likelihood of a specific hash being issued when applying the hash algorithm is therefore (maximum hash value+1)$^{-1}$, that is to say $2^{-256}$ in the case of the SHA 256 algorithm. The likelihood that the resultant hash value will be less than or equal to a limit value or target value is therefore (target)/(max. hash value). For an exemplary maximum limit value of $(2^{16}-1) \cdot 2^{208}$ the likelihood is $[(2^{16}-1) \cdot 2^{208}]/2^{256} \approx 2^{-32}$. The difficulty S of obtaining a hash value which is less than or equal to a selected limit value or target can be specified as follows, depending on a maximum limit value or max. target: S=(max. target)/target. Consequently, the likelihood of obtaining a hash value that is less than or equal to the selected limit value is, for the previously described example: $2^{-32}/S$. By way of example, a computer system with a specific hash rate is considered, which computer finds a hash value which is less than or equal to the selected limit value on average every x·sec. Should the computer system achieve a hit on average every y·sec instead of every x·sec, the difficulty can be adapted accordingly: $S_y=(x/y) \cdot S$. Corresponding adaptations of the difficulty can also be used to keep the hit rates constant in the event of changes to the computer system, for example changes to the computing power by an increase or reduction of the number of blockchain servers. If the difficulty is adapted such that a hit is attained every y·sec, the hash rate R of the computer system can be parameterised as follows: $R=(2^{32} \cdot S)/(y \cdot sec.)$.

If valid blocks are generated by a method requiring a lot of processing power, as described previously, the subscribers of the blockchain network thus trust the longest valid blockchain, since it usually requires the most processing power and it can therefore be assumed that it is acknowledged by the majority of subscribers as being valid. If, for example, there is a fork, i.e. a branching, in the blockchain, the fork with the greatest chain length eventually prevails, since it is assumed that the majority of subscribers are behind it.

A blockchain can be implemented for example also in the form of a private blockchain, wherein only a selected group of subscribers has authorisation to add valid blocks. A corresponding authorisation can be proven for example by means of a signature with use of a private cryptographic key. The private cryptographic key may belong to an asymmetric key pair, to which a public cryptographic key also belongs, with which the signature can be checked. The asymmetric key pair may additionally be associated for example with a certificate which proves the authorisation to generate a valid block of the blockchain. This certificate may also be associated with a PKI, which proves the authenticity of the certificate. In accordance with a further embodiment, for example a public key can be stored in the blockchain for each subscriber from the selected group, for example in a Genesis block. On the basis of this public key it is possible to check whether signatures of blocks and therefore the corresponding blocks themselves are valid.

A consensus can also be implemented in another way in a blockchain. For example, a consensus can be achieved by voting on the inclusion of proposed entries in the blockchain. For example, each subscriber makes a unique list of other subscribers that he trusts as a group. Each subscriber can propose new entries that are to be received in a new block of the blockchain. A vote is taken on the inclusion and thus acknowledgement of the validity of the proposed entries. For example, each subscriber thus only votes for those proposals originating from subscribers on his list. In other words, for the decision as to whether a proposal for a new entry is acknowledged as valid, i.e. whether there is a consensus between the subscribers in respect of the validity of this entry, only the votes of those subscribers included on the list of the subscriber making the corresponding proposal are taken into consideration. In order for a proposal for an entry to be deemed valid, a specific minimum proportion of subscribers eligible to vote must vote yes, for example 80%. All proposed entries that meet this criterion will be included in the blockchain. A vote of this kind may comprise a number of rounds. All other proposals that do not meet the aforesaid criterion will be rejected or put to a vote again when voting on the next block of the blockchain. The aforementioned lists represent subgroups of the blockchain network that are trusted as a whole as a group by the subscriber making a corresponding list, without the need for the subscriber to trust each individual subscriber on the list. An example of such a consensus method is offered by the Ripple Protocol Consensus Algorithm (David Schwartz et al.: "The Ripple Protocol Consensus Algorithm", Ripple Labs Inc, 2014, https://ripple.com/files/ripple_consensus_whitepaper.pdf).

For example, the blockchain may be a private or public blockchain. For example, it is a Bitcoin, Litecoin or Ethereum chain.

In accordance with embodiments the storage ID is a transaction ID of the transaction comprising the first identifier. Embodiments may have the advantage that they enable simple identification of the transaction comprising the first identifier.

In accordance with embodiments a copy of the blockchain is stored in the memory of the first computer system. Embodiments may have the advantage that the blockchain is available at all times.

A blockchain can be designed to be implemented as a decentralised database in a decentralised network, wherein it is stored redundantly and in a decentralised manner on all nodes of the corresponding network. For example, the second electronic device is a node of this kind of a decentralised network. If the connection of a node to the rest of the network is interrupted, the entire blockchain is still available to it. Even if the interruption should last a relatively long period of time, the entire blockchain up to the point of the interruption would still be available to the node, and at most only the newest entries made after this time would be missing. The blockchain can thus ensure efficient access to the data contained therein also in offline operation. If the blockchain is stored on the first computer system, it can additionally be ensured, by regular updating of the blockchain in the memory of the first computer system, that the blockchain is in a sufficiently current state in the event of an interruption of the network connection between the updates.

In accordance with embodiments the communication interface is configured to communicate with the mobile second computer system with use of the Bluetooth® standard. Embodiments may have the advantage that an efficient contactless communication is made possible between the mobile second computer system and the first computer system, wherein in particular the first computer system may also be configured as a mobile computer system. For example, communication occurs with use of Bluetooth® standard 4 or 5.

In accordance with embodiments the second identifier is the Bluetooth® address of the second computer system. Embodiments may have the advantage that, in the event of communication between the mobile second computer system and the first computer system with use of the Bluetooth® standard, the Bluetooth® address provides a unique second identifier to be incorporated easily into the communication.

In accordance with embodiments the first identifier stored in the second database is signed with a private cryptographic key of an asymmetric key pair associated with the ID provider. The method also comprises the following step: by means of the first computer system with use of a public cryptographic key of the asymmetric key pair associated with the ID provider, checking the signature of the first identifier stored in the identified database entry. Embodiments may have the advantage that the authenticity of the database entry is secured. On the basis of the signature it is possible to check that the first identifier, which forms the basis for the confirmation of the validity of the virtual document, was entered by an authority authorised for this purpose and trustworthy. Thus, not only can the integrity of the first identifier be proven, but additionally also its origin. The security can be increased further still hereby. In addition, the validity of the public cryptographic key of the ID provider can be checked by means of a document PKI.

In accordance with embodiments the second database additionally comprises the public cryptographic key of the ID provider. Embodiments may have the advantage that simple access to the public cryptographic key directly following the database query is made possible. If the database additionally is a database with a blockchain structure, wherein the public cryptographic key of the ID provider is stored in one of the transactions, the public cryptographic key, by the chain structure of the blockchain secured by means of the storing of the checksum, is protected against manipulation.

In accordance with embodiments the database entry of the second database additionally comprises the public cryptographic key of the ID provider. Embodiments may have the advantage that they enable simple access to the public cryptographic key.

In accordance with embodiments the first computer system and/or the mobile second computer system are/is a mobile radio device, in particular smartphone. Embodiments may have the advantage that the standard hardware can be used to implement method. In particular, embodiments may have the advantage that smartphones comprise, as standard, the hardware, i.e. display and digital camera, necessary for optical transmission.

In accordance with embodiments the first virtual document is a virtual identity document. Embodiments may have the advantage that they enable a secure and efficient method for authenticating the user of the mobile computer system on the basis of the virtual document.

In accordance with embodiments the database entry of the second database in which the first identifier is stored comprises an expiry date, which defines the end of the validity of the first pairing. Embodiments may have the advantage that a first identifier entered once into the second database, i.e. a pairing between the mobile second computer system and the virtual document registered once, does not retain its validity forevermore, since entries into a blockchain can be neither deleted nor changed. At the end of the validity the pairing must be renewed, i.e. the identifier must be re-entered into the blockchain with a new expiry date. In particular, by means of the request for a new entry of the first identifier at regular intervals, it can be ensured that the pairing between the mobile second computer system and the virtual document has not been cancelled in the meantime.

In accordance with embodiments the method further comprises the following steps:
    checking whether the second database additionally comprises a lock entry which characterises the first identifier as being locked,
    rejecting the first virtual document as invalid if a lock entry is found.

Embodiments may have the advantage that they provide an efficient locking mechanism. Here, for example, all entries with the first identifier are searched for in the second database.

In accordance with embodiments the read first virtual document is deleted from the memory of the first computer system after having been checked. In accordance with embodiments the first virtual document is not stored permanently on the first computer system, for example is stored only in volatile electronic memories. Embodiments may have the advantage that the virtual document is permanently stored solely in the first database, and the user of the mobile second computer system thus retains control of their personal data.

Embodiments also comprise a first computer system for checking the validity of a first virtual document, wherein the first virtual document is provided for the first computer system by means of a mobile second computer system. The first virtual document is stored in a first database of a third computer system, wherein a plurality of virtual documents is stored in the first database. The first computer system comprises a first communications interface for contactless communication with the mobile second computer system and for communication with the third computer system via a network. The first computer system also comprises a first display for displaying the first virtual document. The first computer system has access to a cryptographically secured second database, which comprises identifiers for pairings consisting of computer systems and virtual documents of the first database. The identifiers of the second database comprise a first identifier of a first pairing consisting of the mobile second computer system and the first virtual document. The first computer system is configured to carry out a method for providing and checking the validity of the first virtual document in accordance with any one of the previously described embodiments.

Embodiments of the invention will be explained in greater detail hereinafter with reference to the drawings, in which.

Elements of the following embodiments that correspond to one another will be denoted by the same reference signs.

Figure 1:
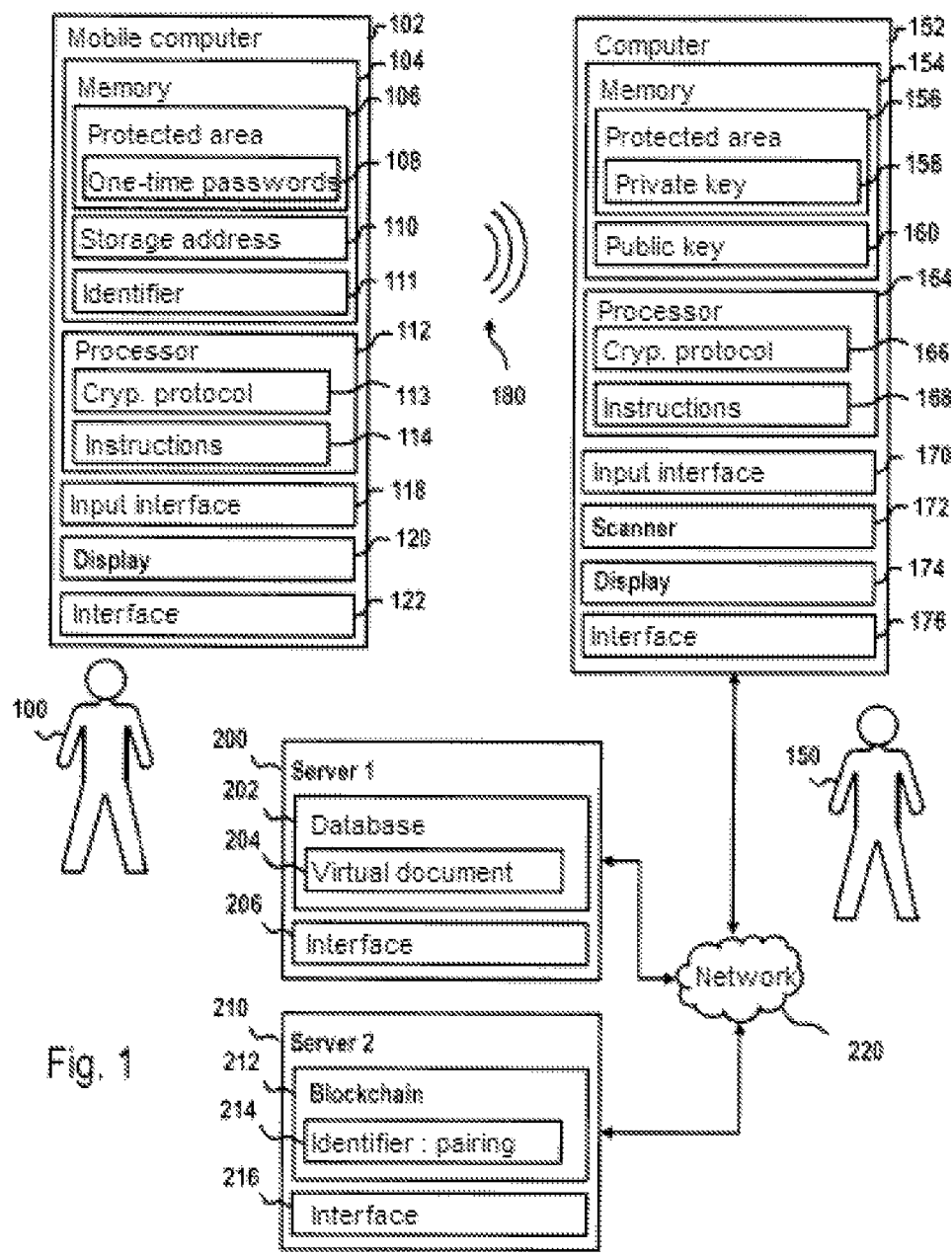
FIG. 1 shows a block diagram of an embodiment of an exemplary system for providing and checking the validity of a virtual document.

FIG. 1 shows a block diagram of an embodiment of an exemplary system comprising a mobile computer system 102, a computer system 152, and a first and a second server 202, 212. The mobile computer system 102 of the user 100 is for example a portable computer system, such as a smartphone. The smartphone 102 comprises a memory 104 with a protected memory area 106 which can be accessed only via a processor 112 of the smartphone 102. At least one one-time password 108 is stored in the protected memory area 106. The one-time password 108 allows one-time access to a virtual document 204 stored at a password protected storage address. The one-time password 108 may have been provided to the smartphone 102 for example in the form of a TAN list from the first server 200 or an authority responsible for operation of the first server 200. In addition, the storage address 110 at which the virtual document 204 can be read is stored in the memory 104. The storage address 110 is for example a URI or URL. The memory 104 also comprises a unique identifier 111 of the smartphone 102, which for example is a Bluetooth® address or IMEI of the smartphone 102.

The smartphone 102 also comprises a processor 112 with instructions 114 for carrying out the method for providing and checking the validity of the virtual document 204. Instructions 114 control in particular the sending of the storage address 110.

The instructions 114 also control the provision of the one-time password 108 for the computer system 152. For example, the one-time password 108 is encrypted with a public key 160 provided by the computer system 152. To this end, the smartphone 102 can comprise cryptographic program instructions 113, which implement a cryptographic protocol. The cryptographic protocol is for example configured to encrypt the one-time password 108 with the public cryptographic key 160. The one-time password 108, encrypted or unencrypted, may also be graphically encoded for display on a display 120 of the smartphone 102. For example, the instructions 114 are configured for encoding the one-time password 108.

Lastly, the smartphone 102 also comprises an input interface 118, which for example can be integrated into the display 120, should this be configured as a touchscreen. The input interface 108 is used for control of the smartphone 102 by the user 100. The display 120 is for example suitable for displaying a graphical code, such as a QR code. For example, the display 120 is a bistable display, e-paper, LCD display (liquid crystal display), or LED display (organic light-emitting diode display), or an AMOLED display (active matrix organic light-emitting diode display). In addition, an interface 122 for contactless communication with an interface 176 of the computer system 152 is integrated into the smartphone 102. For example, the interface 122 is a Bluetooth® or RFID interface, which transmits the storage address 110 by radio signal 180 to the computer system 152 contactlessly.

The computer system 152 of the user 150 is for example likewise a portable computer system, such as a smartphone. However, the computer system 152 could equally be a specially configured verification device or a stationary computer system. The computer system 152 comprises a memory 154 with a protected memory area 156, which can be accessed only via a processor 164 of the computer system 152. A private key 158 of an asymmetric key pair associated with the computer system 152 is stored in the protected memory area 156. In addition, a public key 160 associated with the private key 158 is stored in the memory 154.

The computer system 152 also comprises a processor 164 with cryptographic program instructions 166, which implement a cryptographic protocol. The cryptographic protocol is for example configured to decrypt the one-time password 108, encrypted with the public cryptographic key 160, using the private key 158. Furthermore, the cryptographic program instructions 166 for example can cryptographically protect the communication between the computer system 152 and the first server 200 for transmission of the virtual document 204 via the network 220. In addition, the processor executes program instructions 168, which for example are configured to read and check the validity of the virtual document 204. For example, they are configured to decode a graphical encoding of the one-time password 108.

Furthermore, the computer system 152 comprises a display 174 for displaying the virtual document 204. The computer system 152 also comprises an input interface 170, which for example can be integrated in the display 174, if this is configured as a touchscreen. The input interface 170 is used for control of the computer system 152 by the user 150. The display 174 is for example a bistable display, e-paper, LCD display (liquid crystal display), or LED display (organic light-emitting diode display), or an AMOLED display (active matrix organic light-emitting diode display). In addition, the computer system 152 can be equipped with a scanner 172, for example in the form of a digital camera. Lastly, the computer system 152 also comprises an interface 176, which is configured for contactless communication with the mobile computer system 102 by means of a radio signal 180. The interface 176 can be configured for communication with the two servers 200, 210 via the network 220. For example, the network 220 is an Intranet or the Internet. The communication can be performed here wirelessly and/or via network cables.

By means of the display 120 of the smartphone 102 and of the scanner 172 of the computer system 152, a unidirectional optical communications channel for example can be configured for secure transmission of the one-time password 108 from the smartphone 102 to the computer system 152.

The first server 200 comprises the database 202 and/or provides the virtual documents 204 stored in the database 202 at a password-protected storage address that can be called up via the network 220. For the communication via the network 220, the second server 200 has a corresponding interface 206. For example, the corresponding storage address can be called up by means of a general browser, such as Microsoft Internet Explorer®, Safari®, Google Chrome®, Firefox®, or an application configured especially for this purpose. The server 200 controls the access to the virtual documents 204 so that a document can be read only when a valid password is input or transmitted. In particular, in the case of one-time passwords, the server 200 ensures that a repeated input of a one-time password of this kind does not allow renewed access to the virtual document 204. For communication via the network 220, the first server 200 has a corresponding interface 206. In accordance with embodiments the computer system 152 is a computer system associated with an authority having sovereign powers, such as the police force, with a master password additionally being comprised in the protected memory area 156. In this case, the server 200 controls the access to the virtual documents 204, for example such that the virtual documents 204 can be read each time the valid master password is input or transmitted, i.e. in particular also repeatedly.

The second server 210 comprises and manages a cryptographically secured database in the form of a blockchain 212, which for example can be any publicly accessible blockchain. Identifiers of pairings between computer systems and virtual documents are stored permanently and in a revision-proof manner in the blocks of the blockchain 212. The identifiers can be computed from a unique identifier of the corresponding computer system and the hash value of the corresponding virtual document. The blockchain 212 comprises the identifier 214 of the pairing consisting of the mobile computer system 102 and a virtual document 204. For communication via the network 220, the second server 210 has a corresponding interface 216. In accordance with an alternative embodiment a copy of the blockchain 214 may also be stored locally on the computer system 152. This may allow network-independent access to the blockchain 212.

Figure 2:
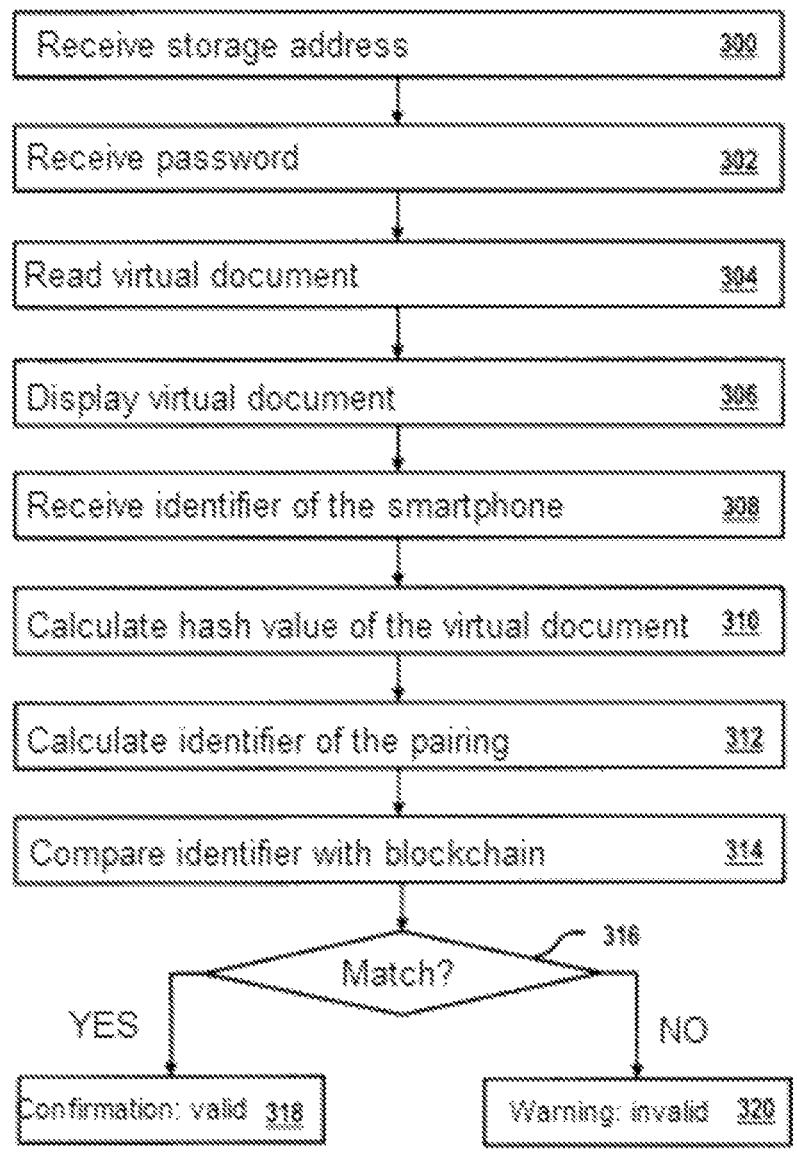
FIG. 2 shows a flow diagram of an embodiment of a first exemplary method for providing and checking the validity of a virtual document.

FIG. 2 shows a flow diagram of an embodiment of a first exemplary method for providing and checking the validity of a virtual document. In block 300 a first computer system receives a password-protected storage address from a mobile second computer system, at which address the virtual document to be checked can be retrieved. For example, a virtual identity document of the user of the mobile second computer system is to be checked. For this purpose, the mobile second computer system sends, for example at predefined time intervals, an unencrypted radio signal containing the storage address, for example in the form of a URI or URL. Upon receipt of the storage address, the user of the first computer system requests that the user of the mobile second computer system for example additionally provides the password necessary for access to the storage address. Alternatively, the user of the mobile second computer system may also provide the password on his own initiative, or a program on the first computer system, which program accesses the storage address, sends a corresponding request for the password automatically to the mobile second computer system. In block 302 the first computer system receives the password for reading the virtual document at the previously received storage address. The password for example is a one-time password, which is displayed on a display of the mobile second computer system. The password can be displayed for example in the form of a QR code. In addition, the password may be encrypted for example with a public key of the first computer system. Alternatively, the user of the mobile second computer system may also communicate the password orally. In the case of encryption with a public key of the first computer system, the first computer system decrypts the password, after receipt, using a corresponding private key.

In block 304 the virtual document is read from the storage address by the first computer system with use of the previously received one-time password and in block 306 is displayed on the display of the first computer system. Here, the transmission of the virtual document can be secured by means of a suitable transport encryption, for example HTTPS. In block 308 an identifier of the mobile second computer system is additionally received. In accordance with embodiments this can be transmitted upon a corresponding request or is already part of the transmission signal containing the storage address. For example, the storage address is transmitted with the use of the Bluetooth® standard and the identifier of the mobile second computer system is the Bluetooth® address of the mobile second computer system. In block 310 a hash of the virtual document is computed, and in block 312 an identifier for the pairing consisting of the mobile second computer system and the virtual document. The mobile second computer system thus serves as an explicit factor for the authentication of its user. In block 314 the computed identifier for the pairing is compared with a blockchain in which identifiers of valid pairings between computer systems and virtual documents are stored. If, in block 316, a match is found between computed and stored identifier, the validity of the virtual document for the present case is confirmed in block 318. This means it is confirmed that the mobile second computer system is authorised to present the virtual document. If, in block 316, no match is found, a warning is issued in block 320 that the virtual document in the present case is not valid. In the case of a valid virtual document, the user of the first computer system can then identify the user of the mobile second computer system with use of the virtual document. To this end, the face of the user of the mobile second computer system for example is compared with a face of the owner of the virtual document displayed on the display of the first computer system. The virtual document is then deleted from the first computer system.

Figure 3:
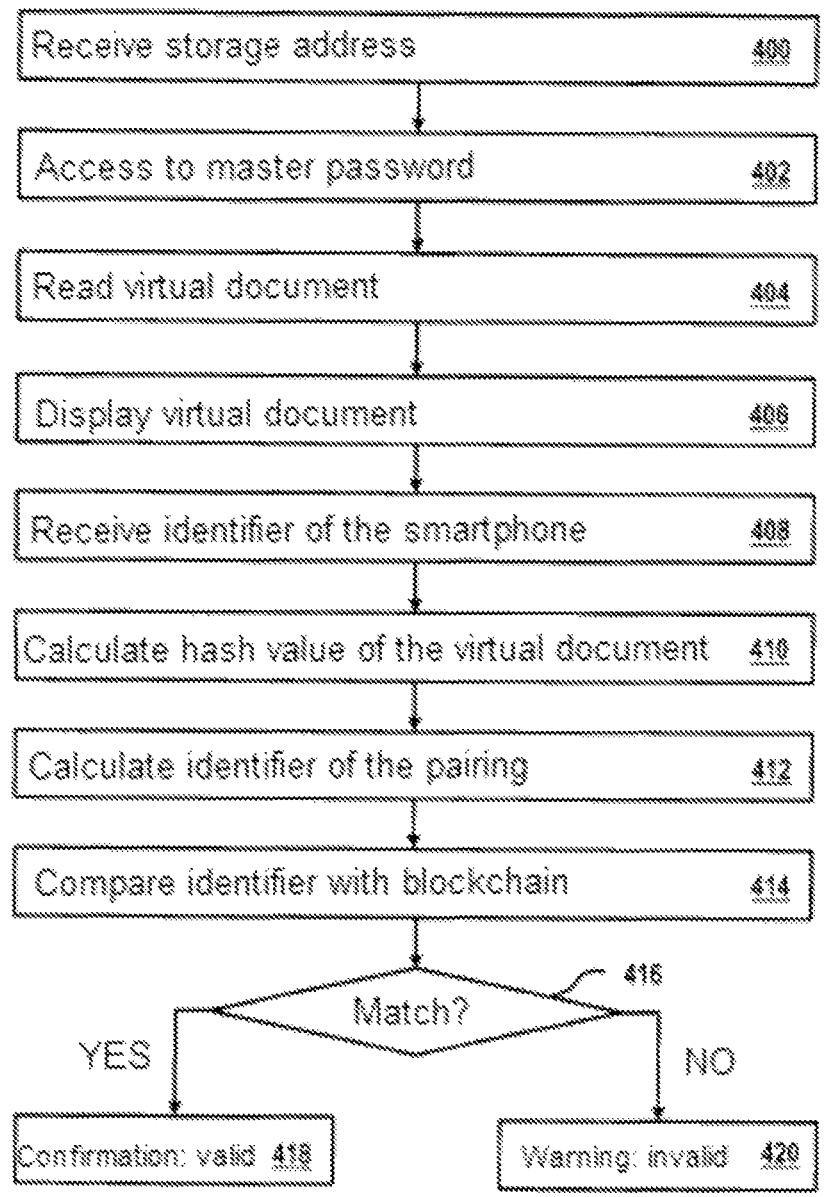
FIG. 3 shows a flow diagram of an embodiment of a first exemplary method for providing and checking the validity of a virtual document.

FIG. 3 shows a flow diagram of an embodiment of a second exemplary method for providing and checking the validity of a virtual document. Here, the block 400 is similar to the block 300 from FIG. 2, and the blocks 404 to 420 are similar to the blocks 304 to 320 of FIG. 2. The difference as compared to the method according to FIG. 2 lies in the fact that, in the case of FIG. 3, no one-time password is received from the mobile second computer system. Rather, the first computer system has a master password with which it can access all virtual documents stored in the corresponding database, if a specific storage address has been received. In the case of the method according to FIG. 3, the first computer system is for example a computer system belonging to the police force.

LIST OF REFERENCE SIGNS 100 user of the mobile computer system
102 mobile computer system
104 memory 106 protected memory area
108 one-time password
110 storage address of the virtual document
111 identifier of the mobile computer system
112 processor
113 cryptographic protocol
114 instructions
118 input interface
120 display
122 interface
150 user of the computer system
152 computer system
154 memory
156 protected memory area
158 private key
160 public key
164 processor
166 cryptographic protocol
168 instructions
170 input interface
172 scanner
174 display
176 interface
180 radio signal
200 first server
202 database
204 virtual document
206 interface
210 second server
212 blockchain
214 identifier of a pairing
216 interface
220 network

The invention claimed is:

1. A method for providing and checking a validity of a first virtual document on a first computer system, wherein the first virtual document is provided by means of a mobile second computer system for the first computer system, wherein the first virtual document is stored in a first database of a third computer system, wherein a plurality of virtual documents are stored in the first database, wherein the first computer system comprises a first communication interface for contactless communication with the mobile second computer system and for communication with the third computer system via a network, wherein the first computer system also comprises a first display for displaying the first virtual document, wherein the first computer system has access to a cryptographically secured second database, which comprises identifiers for pairings, consisting of computer systems and the virtual documents of the first database, wherein the identifiers of the second database comprise a first identifier of a first pairing consisting of the mobile second computer system and the first virtual document, wherein the method comprises:

receiving a password-protected storage address of the first database at which the first virtual document can be read,
reading the first virtual document,
displaying the first virtual document on the first display of the first computer system,
receiving a unique second identifier of the mobile second computer system,
calculating a third identifier using the received second identifier and a hash value of the first virtual document,
identifying a database entry of the second database in which the first identifier is stored,
comparing the calculated third identifier with the first identifier stored in the identified database entry,
if the calculated third identifier matches the stored first identifier, confirming the validity of the first virtual document.

2. The method according to claim 1, wherein a master password for reading virtual documents from the first database is stored in a protected memory area of a memory of the first computer system, wherein the first virtual document is read with use of the master password.

3. The method according to claim 1, wherein the method further comprises:
receiving a password for reading the first virtual document, wherein the first virtual document is read with use of the received password.

4. The method according to claim 3, wherein the received password is a one-time password, with which the virtual document at the password-protected storage address can be read once.

5. The method according to claim 3, wherein receiving the password comprises the following:
scanning the password, which is displayed on a second display of the mobile second computer system, using a scanner of the first computer system.

6. The method according to claim 5, wherein the scanner is a digital camera.

7. The method according to claim 5, wherein the received password is displayed on the second display in the form of a graphical code.

8. The method according to claim 7, wherein the graphical code is a QR code.

9. The method according to claim 3, wherein the received password is encrypted using a public cryptographic key of an asymmetric key pair associated with the first computer system, wherein the method also comprises:
decrypting the received password with use of a private cryptographic key of the asymmetric key pair.

10. The method according to claim 1, wherein the method also comprises:
receiving a storage ID of the second database, wherein the storage ID identifies the entry of the second database in which the first identifier is stored, and wherein the database entry of the second database in which the first identifier is stored is identified using the storage ID.

11. The method according to claim 1, wherein the second cryptographic secured database is a blockchain and the first identifier is stored as a transaction in a block of the blockchain.

12. The method according to claim 10, wherein the storage ID is a transaction ID of the transaction comprising the first identifier.

13. The method according to claim 11, wherein a copy of the blockchain is stored in a memory of the first computer system.

14. The method according to claim 1, wherein the first communications interface is configured to communicate with the mobile second computer system using the Bluetooth® standard.

15. The method according to claim 1, wherein the second identifier is a Bluetooth® address of the second computer system.

16. The method according to claim 1, wherein the first identifier stored in the second database is signed with a private cryptographic key of an asymmetric key pair associated with an ID provider, wherein the method also comprises: by means of the first computer system with use of a public cryptographic key of the asymmetric key pair associated with the ID provider, checking the signature of the first identifier stored in the identified database entry.

17. The method according to claim 16, wherein the second database additionally comprises the public cryptographic key of the ID provider.

18. The method according to claim 17, wherein the database entry of the second database additionally comprises the public cryptographic key of the ID provider.

19. The method according to claim 1, wherein the first computer system and/or the mobile second computer system is a mobile radio device, in particular a smartphone.

20. The method according to claim 1, wherein the first virtual document is a virtual identity document.

21. The method according to claim 1, wherein the database entry of the second database in which the first identifier is stored comprises an expiry date, which defines the end of the validity of the first pairing.

22. The method according to claim 1, wherein the method further comprises:
  checking whether the second database additionally comprises a lock entry which characterises the first identifier as being locked,
  rejecting the first virtual document as invalid if a lock entry is found.

23. A first computer system for providing and checking a validity of a first virtual document, wherein the first virtual document is provided for the first computer system by means of a mobile second computer system, wherein the first virtual document is stored in a first database of a third computer system, wherein a plurality of virtual documents are stored in the first database, wherein the first computer system comprises a first communications interface for contactless communication with the mobile second computer system and for communication with the third computer system via a network, wherein the first computer system also comprises a first display for displaying the first virtual document, wherein the first computer system has access to a cryptographically secured second database, which comprises identifiers for pairings, consisting of computer systems and virtual documents of the first database, wherein the identifiers of the second database comprise a first identifier of a first pairing consisting of the mobile second computer system and the first virtual document, wherein the first computer system is configured to carry out the method according to claim 1.

* * * * *